United States Patent

[11] 3,607,403

| [72] | Inventor | Frank C. Arrance<br>Costa Mesa, Calif. |
|------|----------|---------------------------------|
| [21] | Appl. No. | 776,133 |
| [22] | Filed | Nov. 15, 1968 |
| [45] | Patented | Sept. 21, 1971 |
| [73] | Assignee | McDonnell Douglas Corporation<br>Santa Monica, Calif. |

[54] SELF-CHARGING BATTERY INCORPORATING A SOLID-GAS BATTERY AND STORAGE BATTERY WITHIN A HONEYCOMB MATRIX
21 Claims, 10 Drawing Figs.

[52] U.S. Cl. ................................................ 136/6,
 136/3, 136/38, 136/86, 136/146
[51] Int. Cl. ................................................ H01m 35/00,
 H01m 27/00
[50] Field of Search ................................ 136/86,
 120, 30, 36, 38, 37, 20, 3, 100, 102, 6, 120,
 142–146, 164, 165, 58, 59; 174/68.5

[56] References Cited
UNITED STATES PATENTS
413,339 10/1889 Eickemeyer ................ 136/162 X

| 3,021,379 | 2/1962 | Jackel | 136/145 |
|-----------|--------|--------|---------|
| 3,077,507 | 2/1963 | Kordesch et al. | 136/86 |
| 3,083,250 | 3/1963 | Geissbauer | 136/38 |
| 3,198,990 | 8/1965 | Katzin | 165/Honeycomb Digest |
| 3,228,798 | 1/1966 | Hart | 136/86 |
| 3,287,164 | 11/1966 | Arrance | 136/9 |
| 3,347,707 | 10/1967 | Southworth et al. | 136/28 |
| 3,379,570 | 4/1968 | Berger et al. | 136/6 |
| 3,338,746 | 8/1967 | Plust et al. | 136/3 |

FOREIGN PATENTS

| 197,204 | 5/1923 | Great Britain | 136/145 |
| 1,095,694 | 12/1967 | Great Britain | 136/86 |

Primary Examiner—Winston A. Douglas
Assistant Examiner—A. Skapars
Attorney—Max Geldin ABSTRACT: A self-charging battery unit incorporating solid-fluid battery cell sections and high energy density storage cell sections formed within a honeycomb matrix which acts to support and separate the electrodes, the solid-fluid cell sections being actuable to charge the storage cell sections when the latter are discharged.

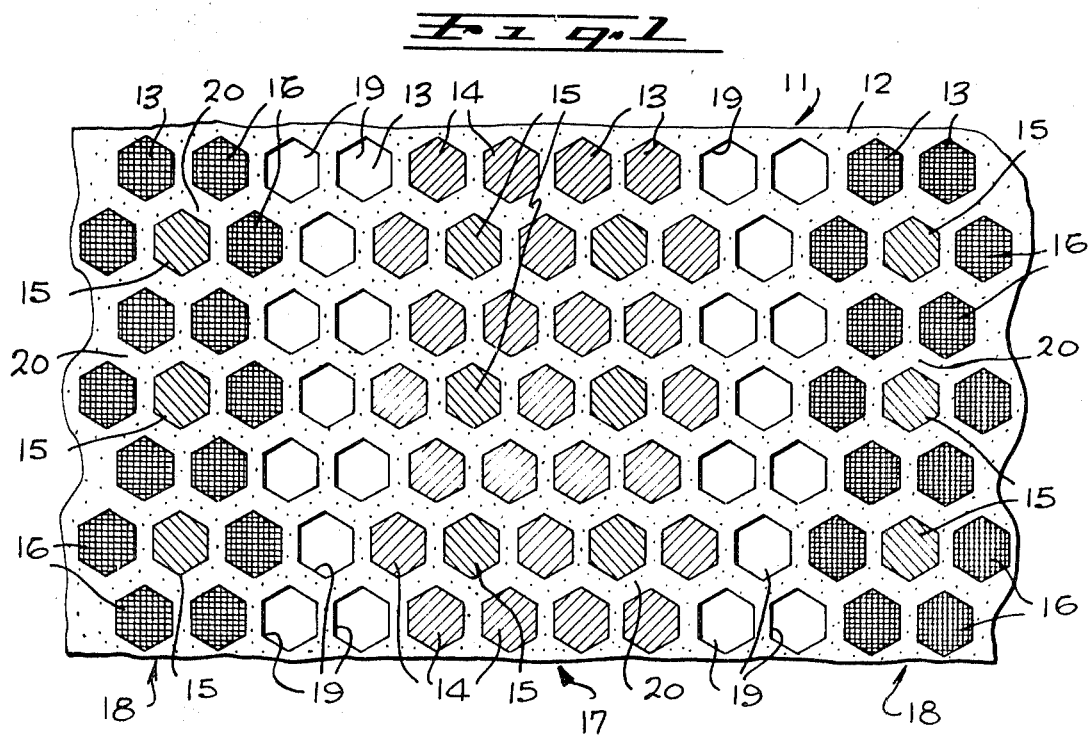
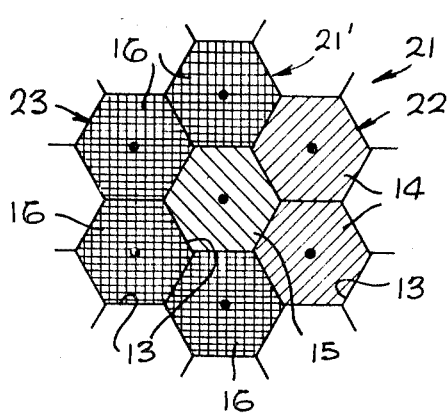
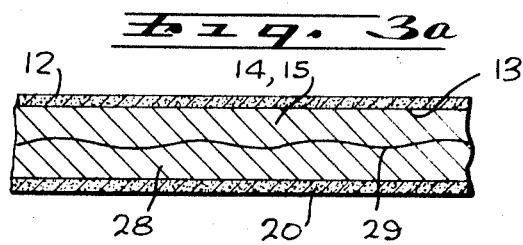
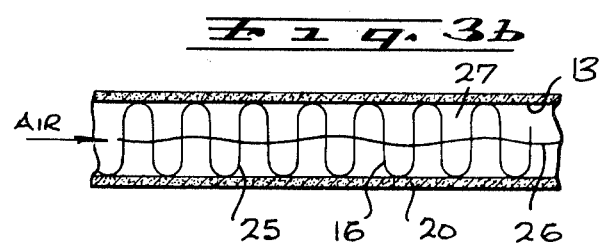
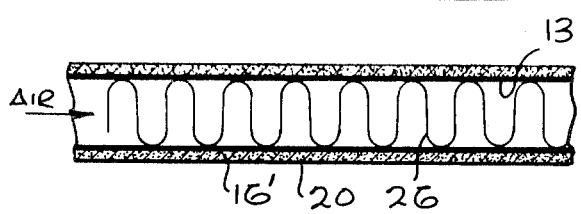
FRANK C. ARRANCE
INVENTOR.
BY Max Gelden
ATTORNEY

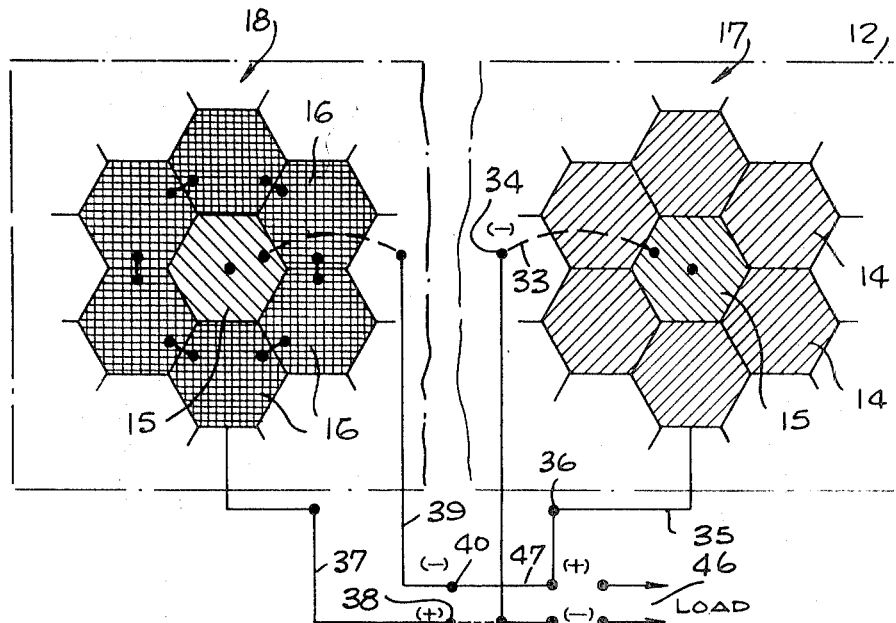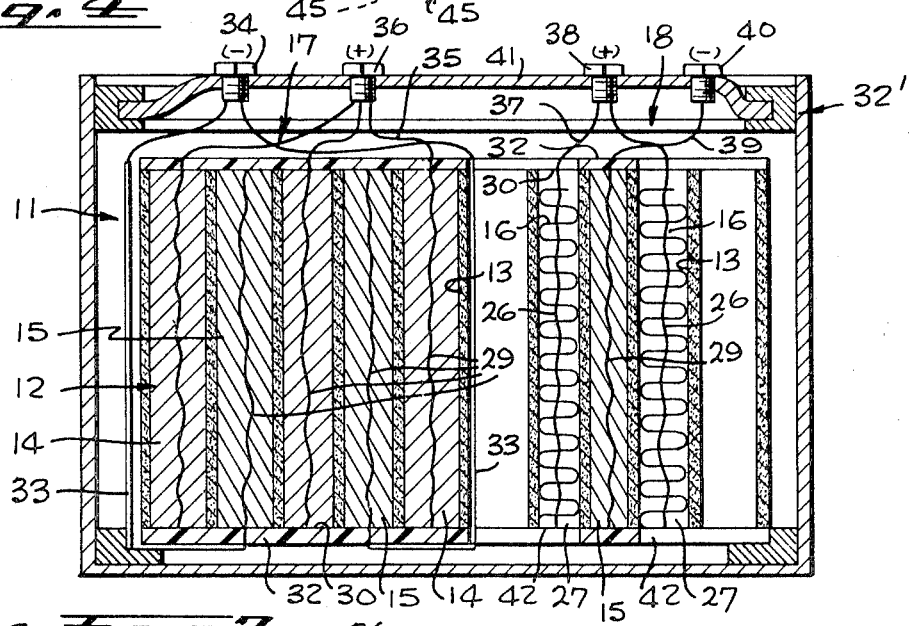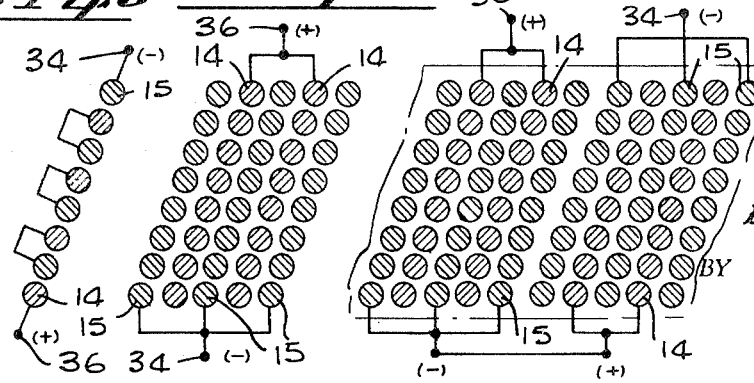

SELF-CHARGING BATTERY INCORPORATING A SOLID-GAS BATTERY AND STORAGE BATTERY WITHIN A HONEYCOMB MATRIX

This invention relates to batteries, particularly high energy density batteries, and is especially concerned with an improved electrode-separator combination fabricated in the form of a unit which can be readily assembled in a case, with suitable electrical connections, to form an efficient self-charging battery. Particularly, the invention is directed to the production of a self-charging battery incorporating the combination of a solid-gas battery and storage battery in a separator construction having superior strength, versatility and efficiency.

Batteries are an important source of energy storage for power generation. In addition to the common lead-acid storage battery, an important type of battery particularly suited for many applications are the high energy density alkaline electrolyte cells using such electrode combinations as silver-zinc, silver-cadmium and nickel-cadmium. High energy density batteries are generally battery systems which have a substantially higher energy per unit of weight than conventional, e.g., lead-acid, storage batteries.

More recently there have been developed related high energy density solid-fluid batteries, particularly so-called zinc-air batteries or cells employing as one electrode an active battery type electrode such as a zinc electrode and as the second electrode a catalyst electrode such as platinum. Such a battery operates by bringing a gas such as oxygen or air into contact with the catalyst electrode, causing the gas to react and form ions which react with the active battery electrode and generate an electric current. A cell of this type has the characteristics of both a fuel cell and a battery.

The above described high energy density storage and solid-fluid batteries have many applications such as in portable tools and appliances, television, radio and record players, engine starting, portable X-ray units and the like. In such batteries, it is conventional to employ a separator or membrane, e.g., in the form of a porous member, between the electrodes. The separator performs the function of retaining electrolyte, e.g., potassium hydroxide, separating the electrodes, and preventing migration of electrode ions or growth of dendritic crystals of electrode ions which short circuit the battery.

Such separators or membranes can be constructed of either inorganic or organic materials, the preferred separators usually being inorganic separators. Improved inorganic separators particularly suited for use in high energy density batteries are described, for example, in the application of Carl Berger and Frank C. Arrance, Ser. No. 499,294, filed Oct. 21, 1965, now U.S. Pat. No. 3,379,570. Such inorganic separators, preferably in the form of ceramic separators, when assembled in a battery of this type, e.g., a silver-zinc high energy density battery, have resulted in substantially improved battery life at both ambient and elevated temperatures, that is, a battery capable of operating efficiently over a large number of discharge-charge cycles, and such batteries are also operable at high temperatures, e.g., of the order of 100° C. and above.

In connection with the development particularly of inorganic separators in the form of thin ceramic membranes, however, due to the thinness of such membranes it has been difficult to produce large ceramic membranes for use in larger batteries and also it has been difficult to form these membranes into various shapes and configurations. Thus, while the smaller configurations have proved highly successful, scaleup to larger dimensions using thin ceramic membranes to increase the energy density of such high energy density cells using conventional plate and separator configurations, is difficult.

When employing conventional separators in the form of plates or membranes, it is also necessary when assembling such separators in a battery, together with the necessary electrodes or electrode plates, to mount the individual separators in properly spaced relation to provide electrode compartments between adjacent separators, and to then insert the electrodes in the electrode compartments between an adjacent pair of separators. This not only requires proper spacing of the separators so as to receive the electrodes therebetween in relatively snug fitting relation, but also requires that the electrode compartments on opposite sides of a separator be properly insulated to prevent short circuiting of electrolyte from one electrode compartment around a separator and into the adjacent electrode compartment. Further, when employing certain types of electrodes such as zinc electrodes which tend to slump or change shape in a relatively short period of time because of mechanical or electrochemical deterioration, it is often necessary to support such electrodes between adjacent separators forming the electrode compartment, to provide an electrode of suitable strength to withstand satisfactory periods of operation.

Conventional organic separator plates and membranes have been found particularly deficient because of inferior strength characteristics tending toward rapid deterioration and failing of such organic separators, resulting in poor wet stand, internal shorting and limited useful life.

The above-described separator problems have been substantially eliminated by employing as the battery separator a nonmetallic honeycomb, and providing an electrode-separator unit which comprises such honeycomb and electrode materials such as zinc and silver positioned in the cells of the honeycomb, as described and claimed in my copending application Ser. No. 603,016, filed Dec. 19, 1966.

As in the case of conventional batteries such as silver-zinc batteries, honeycomb batteries of the type described in my above copending application Ser. No. 603,016 require periodic recharging by an external power source.

According to the concept of the present invention, a nonmetallic honeycomb matrix of the type described in my above copending application is employed as a unitary structure to house a battery section and a solid-fluid charging section, the battery section containing rechargeable active battery electrodes and the solid-fluid charging section containing active electrodes and catalyst electrodes, the honeycomb matrix functioning as the common separator for both the active battery electrodes and the solid-fluid charging section electrodes, with means provided for electrically connecting the solid-fluid electrodes of the charging section with the active electrodes of the battery section, for charging the latter section after a period of use of the storage battery section. Thus, there is provided a compact unitary self-rechargeable battery requiring no external power source for charging.

Thus, a novel self-charging battery has now been developed according to the invention, which comprises a honeycomb matrix composed of a suitable battery separator material, and incorporating at least one and preferably a plurality of battery or storage cell sections for generating power, and at least one and preferably a plurality of charging or solid-fluid cell sections for recharging the storage cell sections. The novel self-charging battery unit of the invention provides continuous and long operating life in comparison to presently available battery systems. Potential applications include any of the applications mentioned above or anywhere for example that a high energy density cell may be required. One very attractive application is in self-propelled vehicles. In such case the battery sections for generating power and the solid-fluid cell sections for charging the battery sections, can be arranged in banks so that the vehicle can be powered by one bank of batteries while other banks of power generating storage cell sections are being charged by the solid-fluid cell sections. Other interesting applications include situations where small units are desired, for example, in hearing aids, heart pacers and miniature radios.

More particularly, the self-charging battery of the invention comprises a nonmetallic, that is organic plastic or inorganic honeycomb matrix, as described more fully hereinafter, containing at least one rechargeable battery section for generating power and at least one charging section for charging said battery section, said battery section comprising a first set of first and second active electrodes of opposite polarity positioned in cells of said honeycomb matrix, said charging section being a solid-fluid section comprising a second set of third and fourth electrodes of opposite polarity positioned in other cells of said honeycomb matrix, said third electrodes being catalyst gas diffusion electrodes and said fourth electrodes being active battery electrodes, said honeycomb matrix being a common separator for said first and second electrodes of said at least one rechargeable battery section and for said third and fourth electrodes of said at least one charging section, and means for electrically connecting said third and fourth electrodes of said at least one charging section to said first and second electrodes of said at least one battery section for charging same. The first and second electrodes of the battery section are positioned in adjacent cells of the honeycomb matrix, and the third and fourth electrodes of the charging section are positioned in adjacent cells of the honeycomb matrix. Generally, a plurality of battery sections and a plurality of charging sections is employed.

Thus, for example the first and second active electrodes of the battery sections of the honeycomb can be silver and cadmium, and the third and fourth electrodes of the solid-fluid charging sections can be an oxygen catalyst electrode and zinc respectively. However, the active electrode of the solid-fluid sections and one of the active electrodes of the battery sections can be formed of the same active electrode matrix, e.g., zinc. Thus, in a preferred embodiment the above-noted second or negative electrode of the active battery sections can be zinc instead of cadmium, so that the negative electrodes of both the active battery sections and the solid-fluid charging sections can both be zinc. Under those conditions, the cells of the honeycomb matrix contain three electrode materials rather than four electrode materials, forming, for example silver-zinc active battery cell sections and zinc-catalyst electrode cell sections for recharging the silver-zinc active battery sections, as noted below.

Thus, there is provided according to a preferred embodiment of the present invention an electrode-separator unit comprising a nonmetallic honeycomb matrix having positioned therein a first electrode material, e.g., Ag, a second electrode material, e.g., zinc Zn, and a third catalyst electrode material, e.g., Pt, so that the electrode materials are separated by the honeycomb wall. Thus, the respective electrode materials are disposed in different cells of the honeycomb matrix, each of such electrode materials being disposed in one or more cells of the matrix. Preferably, the first electrode material, e.g., Ag, is positioned in a first series of cells, the second electrode material, e.g., Zn is positioned in a second series of cells, and the third catalyst electrode material, e.g. Pt, is positioned in a third series of cells of the honeycomb matrix. Also, preferably, the second series of cells containing the second electrode material are adjacent both the first series of cells containing the first electrode material and to the third series of cells containing said third catalyst electrode material. Preferred also in practice, the second series of cells containing the second electrode material is divided so that some of the cells of the second series are adjacent the first series of cells containing the first electrode material, and the remaining cells of the second series containing the second electrode material are adjacent the third series of cells containing the third catalyst electrode material. Accordingly, in preferred practice, the cells containing the second electrode material are in alternate juxtaposition with respect to the cells containing the first electrode material and with respect to the cells containing the third catalyst electrode material, whereby adjacent first and second electrode materials of opposite polarity, and adjacent second and third electrode materials of opposite polarity, are separated from each other by a single cell wall. The cell or cells containing the third catalyst electrode material contain a free fluid or gas diffusion space therein to permit diffusion of a fluid or gas into such cells for contact of said gas with the catalyst electrodes.

Thus, in the self-charging unit according to the preferred embodiment of the invention, the first electrode material, e.g. Ag, and the second electrode material, e.g., Zn, constitute a high energy density battery cell which is first discharged, and the second electrode, e.g., Zn, and the third catalyst electrode, e.g., Pt, constitute the solid fluid cell which acts to recharge the high energy density storage cell. Suitable electrical connections are provided between said second and third electrodes of the solid-fluid cell, and between said first and second electrodes of the battery cell, to permit charging of the battery cell by the solid-fluid cell, when desired, as described in greater detail below.

The honeycomb or honeycomb matrix forming the separator of the unit can be formed of any suitable nonmetallic separator material, including an organic material such as a synthetic resin having suitable porosity characteristics, but in preferred practice for obtaining substantially greater strength and efficiency, the honeycomb matrix is formed of a porous inorganic material, particularly a porous ceramic material. In addition to enhanced strength of the honeycomb separator matrix, the honeycomb can be shaped in any desired manner to produce any desired configuration. Further, due to the geometry of the honeycomb, greater energy density is obtained from the battery portion contained therein. Also, large self-charging batteries can be produced when employing the invention principles.

As will be clearly noted below, the honeycomb serving as a common separator for both the battery portion and a solid-fluid cell recharging portion, preferably has a substantially continuous wall, and has substantial depth in comparison to wall thickness, thus permitting incorporation of a substantial portion of electrode material into the individual cells of the honeycomb, the walls of the honeycomb forming the separator.

The employment of a honeycomb matrix as the separator according to the invention permits the provision of a unit externally of the battery by first filling the cells of the honeycomb with the suitable electrode materials. When so assembled, an electrode-separator pack or unit is provided in which each of the electrode compartments is fully insulated by the honeycomb cell walls and wherein each of the electrodes is supported by surrounding cell walls of the honeycomb, preventing slumping or disintegration of the electrode materials, e.g., zinc, within its compartment. One or preferably both ends of the cells containing the active battery electrode materials, e.g., the zinc and silver electrodes, can be covered by a suitable insulation material to close the ends of the respective cells containing the electrode material. Thus, when assembling the unit of the invention in a battery, there is avoided the problem when employing individual separators or membranes and electrodes, of requiring first the proper supporting of such individual separators in suitably spaced relation to provide electrode compartments, and there is also avoided the necessity under these conditions for providing means to properly insulate adjacent electrode compartments from each other.

The invention will be more clearly understood by reference to the description below of certain preferred embodiments of the invention taken in connection with the accompanying drawing, wherein:

FIG. 1 is a horizontal cross-sectional representation of a unit for a self-charging battery employing a honeycomb matrix showing one arrangement of the electrodes in the cells of the honeycomb;

FIG. 2 is a horizontal cross-sectional schematic representation showing another arrangement of the electrodes in the cells of the honeycomb matrix according to the invention;

FIGS. 3a, 3b and 3c are sectional details of the cells containing the first and second electrodes and the third catalyst electrodes;

FIG. 4 shows the manner of assembly of the unit of FIG. 1 according to the invention, to form a self-charging battery;

FIG. 5 is an enlarged vertical cross-sectional schematic representation of the honeycomb matrix as illustrated in FIG. 1 including the battery and recharging sections, and shows the electrical connections for discharging and recharging the battery cells thereof;

FIGS. 6, 7 and 8 illustrate connection of the high energy density storage cell sections in an electric circuit in series, in parallel, and in series parallel, respectively.

The showings in the drawings are exaggerated for purposes of greater clarity.

Referring now to FIG. 1, there is shown the self-charging unit 11 of the invention in a separator unit composed of a porous nonmetallic honeycomb matrix 12, e.g., an aluminum oxide matrix, certain of the cells 13 of which are filled with electrode material according to the invention. In the arrangement shown, certain of the cells 13 contain a first electrode material 14, e.g., Ag, certain of the cells contain a second electrode material 15, e.g., Zn, and certain of the cells 13 contain a third catalyst electrode 16, e.g., Pt. The cells containing the electrode materials 14, 15 and 16 are arranged to form one or more battery storage cell sections 17 and one or more charging sections 18. As shown in FIG. 1, the honeycomb cells 13 containing the second electrode material 15 are adjacent the cells containing the first electrode material 14, to form the high energy density 1 battery cell sections 17 of the self-charging battery system, and the cells 13 containing the second electrode material 15 are adjacent the cells containing the third catalyst electrode material 16 to form the solid-fluid cell charging sections of the self-charging battery system.

In discharging, the battery or storage cells shown generally at 17 are connected in an electric circuit to a load, as described in detail hereinafter; for recharging, the storage cells are connected in an electric circuit to the solid-fluid cell sections 18. The cell walls 20 form the separator between adjacent cells 13 containing the electrode materials 14, 15, and 16. The remaining cells 13 of the honeycomb matrix between the battery and charging sections 17 and 18 in this embodiment are unfilled, as indicated at 19. However, as will be seen in FIG. 3 and described below, there need not be present unfilled or empty cells between the electrodes of the respective battery and charging sections.

FIG. 2 shows a cross-sectional schematic representation of another arrangement of cells in a honeycomb matrix 21' to form a self-charging battery unit 21 according to the invention. In this embodiment, the cells 13 of the honeycomb matrix containing the second electrode material 15 are adjacent both to the cells 13 containing the third catalyst electrode material 16 and to the cells containing the first electrode material 14. Thus, the second e.g., zinc, electrode 15 is common to both the battery sections 22 including the first, e.g., silver, electrodes 14, and to the charging section 23, including the catalyst electrodes, e.g., Pt, 16.

Referring to FIGS. 3a, 3b and 3c, showing vertical sections through the first electrodes 14, second electrodes 15 and third electrodes 16 in greater detail, as seen in FIG. 3b, the third catalyst electrodes 16 are provided by inserting into the air cells 13, a catalyst material 16 such as platinum, or platinum black in the form of a screen 25 such as tantalum screen impregnated with platinum. A collector or collector wire 26 is preferably also inserted into the air cells 13 in contact with the catalyst screen 25, wire 26 extending beyond the ends of the cells 123 containing the third catalyst electrode material 16 for attachment of suitable electrical connections. Sufficient free space is provided in the cells 13 around 25 and 26 to provide an air passage 27 in the cells 13 containing the third catalyst electrode material 16. Alternatively, as illustrated in FIG. 3c, the catalyst material 16, e.g., platinum or platinum black, can be coated on the honeycomb walls 20 of the air cells 13 as indicated at 16', and the collector screen 26 is forced into snug engagement with the catalyst coating 16' to provide efficient contact.

Cells 13 containing the first electrode material 14, e.g., silver and the second electrode material 15, e.g., zinc, which materials can be in the form of a powder, are contained in the cells 13 of the honeycomb matrix 12, as indicated at 28, and a metallic collector wire 29 or a collector screen is embedded in and passes through the respective zinc or silver electrodes and extends beyond the ends of the cells 13. Alternatively, a zinc or silver sheet in rolled form can be inserted into the appropriate cells in place of the powder 28, to form the electrodes.

As previously noted, the honeycomb matrix 12 forming the separator, is preferably formed of an inorganic material. Inorganic separator materials which can be used to form the porous honeycomb 12 can include a variety of substances. Thus, for example, suitable inorganic separator materials include insoluble hydrous metal oxides such as the hydrous oxides of zirconium, titanium, antimony, tungsten, silicon, scandium, bismuth, vanadium, aluminum and cerium. Such as hydrous metal oxide separator materials and their method of preparation are described in the copending application Ser. No. 379,093, filed June 30, 1964 of Carl Berger et al. now U.S. Patent No. 3,489,618. A preferred separator of this type is hydrous zirconium oxide or zirconia.

Other porous inorganic materials which can be employed for producing the honeycomb separator according to the invention include the aluminosilicates, particularly the alkali metal and alkaline earth metal aluminosilicates, alumina and silica, particularly because of their formation of a hard ceramic material upon sintering, while still retaining suitable porous characteristics. The aluminosilicates are particularly preferred in this respect. Examples of such aluminosilicates include aluminosilicate, sodium and potassium aluminosilicates, and magnesium, calcium, barium and strontium aluminosilicates. These materials can be used separately, but often mixtures of these aluminosilicates are used, e.g., complex mixtures of both the alkali metal and alkaline earth metal aluminosilicates. Such inorganic separator material are described in above U.S. application Ser. No. 499,294, now U.S. Pat. No. 3,379,570.

Another useful class of inorganic separator materials are the naturally occuring clays containing aluminum oxide and silica usually together with bound water, and having the formula $Al_2O_3 \cdot 2SiO_2 \cdot 2H_2O$. In addition to kaolinite, other useful members of this group include the mineral clays halloysite, dickite, nacrite and anauxite.

Other types of inorganic separators which can be employed include those in the form of a solid solution of magnesium silicate and zinc silicate, or a solid solution of magnesium silicate and iron silicate as described and claimed in the copending application Ser. No. 539,554, filed Apr. 1, 1966 of Frank C. Arrance et al., now U.S. Pat. No. 3,446,668, and the inorganic separators in the form of a solid solution of an aluminum-bearing material such as aluminum oxide, and a substance selected from the group consisting of chromium, cobalt, nickel, magnesium, calcium and iron bearing materials, e.g., a mixture of alumina and chromic oxide, as described and claimed in copending application Ser. No. 555,891, filed June 7, 1966 of Frank C. Arrance et al., now U. S. Pat. No. 3,446,669.

Still other types of suitable inorganic materials for production of the honeycomb matrix include a solid solution of a major proportion of magnesium oxide and a minor proportion of an oxide such as zirconium oxide, chromium oxide and aluminum oxide, as described and claimed in the copending application, Ser. No. 727,394 of Frank C. Arrance et al., filed May 8, 1968; and a solid solution formed from a mixture of $Cr_2O_3$, $Al_2O_3$, $FeO$ and $MgO$, as described and claimed in my copending application Ser. No. 727,678, filed May 8, 1968.

The term "ceramic material" as employed herein is intended to denote types of inorganic materials such as those noted above. Accordingly, a porous ceramic honeycomb matrix of suitable porosity characteristics, as described more fully below, forms the preferred honeycomb matrix according to the invention.

Various types of known procedures can be employed for producing the preferred porous ceramic honeycomb. Thus, for example, according to one procedure a cardboard or other organic honeycomb can be soaked or immersed in a ceramic slip, e.g., containing aluminum oxide, and then fired. The porosity of the cardboard and the concentration of the ceramic slip control the initial porosity. During firing, the cardboard or other organic material is decomposed and is removed, leaving a ceramic honeycomb whose final porosity can be adjusted by subsequent firing. Alternative procedures can be employed, such as extrusion through a die, by pressing, casting and hydrostatic pressing.

Although not preferred, an organic honeycomb matrix can be employed in the invention. Suitably inert organic materials or plastics having suitable porosity characteristics which can be employed include, for example, microporous plastics such as nylon, Dynel (vinyl-acrylic copolymer), Teflon (polytetrafluoroethylene), cellophane or regenerated cellulose, and the like. Although such organic honeycombs can be employed, the strength chemical inertness and electrode support characteristics of the inorganic or ceramic honeycombs are significantly superior.

Ion exchange materials can also be employed to produce the honeycomb matrix. These include, for example, aluminum vanadates, thorium phosphates and zirconium phosphates. Also, organic ion exchange materials such a polystyrene type ion exchange materials, can be employed.

The porosity of the materials of which the honeycomb matrix is composed should be such that the walls of the honeycomb function as a battery separator, that is, to retain electrolyte, and permit transfer to electrolyte ions but prevent transfer of electrode ions. The honeycomb cell walls preferably have a porosity in the range from about 5 to about 50 percent, usually about 10 to about 30 percent. The abovenoted porous inorganic ceramic materials in particular have such porosity characteristics. The thickness of the cell walls, e.g., 20, of the honeycomb matrix, particularly where an inorganic honeycomb is employed, can range, for example, from about 0.005 inch to about 0.050 inch, although this range is only understood to be exemplary.

In filling the cells of the honeycomb with the active electrode materials, the electrode material, e.g., in the form of a paste or powder can be forced into the cells, as by tamping. Alternatively, this can be accomplished by placing a vacuum tight tool over the honeycomb to enable evacuation of the honeycomb, and when so evacuated, the electrode material can be injected into the honeycomb cells in any suitable manner. After the honeycomb is filled with the electrode paste or powder, the electrode materials are permitted to set and dry. Suitable insulation is then provided over one or preferably both of the ends of the cells containing the first and second electrode materials, as indicated at 32 in FIG. 4, but not over the ends of the cells containing the catalyst electrode material. For this purpose, organic resins can be employed such as, for example, epoxies, polyvinyl resins and rubber type material such as Neoprene type compounds and ethylene-propylene rubbers.

Any type of active electrode materials can be employed to form an electrode-separator unit employing a honeycomb matrix according to the invention. These include in addition to zinc, cadmium and lithium, for example, for the second negative electrode material of the active battery cells, and for the fourth negative electrode material of the solid-fluid battery cells. In addition to silver oxide for the first positive electrode material of the active battery cells, other materials, for example copper oxide, magnesium dioxide and cadmium oxide can also be employed.

After incorporation of all of the active electrode materials and the catalyst electrodes into the cells of the honeycomb, and prior to positioning the insulating covers 32 over the end faces 30 (see FIG. 4) of the honeycomb to close the ends of the cells containing the first and second electrode materials, suitable electrolyte solutions, e.g., an aqueous potassium hydroxide solution, can be introduced into the honeycomb to impregnate the walls thereof and the first and second electrode materials, e.g., zinc and silver oxide, by vacuum soaking or by other conventional procedures with suitable precautions being taken to prevent introduction of free electrolyte into the fluid or gas passages of the third catalyst electrode compartments, to prevent flooding thereof.

Where the honeycomb matrix is formed of an ion exchange material, and such material itself functions as the electrolyte to conduct the ions, an electrolyte solution need not be employed. Such ion exchange materials include for example, aluminum vanadates, and organic ion exchange materials as discussed previously. Hence, the term "ion conducting," refers to the material of which such a honeycomb can be formed, and is intended to denote ion exchange materials as exemplified above.

Various fluids can be employed as fuels to power the solid-fluid cell sections of the self-charging battery unit by passage of such fluid through the gas diffusion passages, e.g., 27, of the honeycomb cells 13 containing the catalyst electrodes 16. Preferably, such fluids are gases, which include, for example, air or oxygen, hydrogen, gaseous hydrocarbons such as propane, and halogens such as chlorine or bromine. Also, liquids can be employed as the fluid for action at the catalyst electrodes, including, for example, hydrazine, liquid hydrocarbons, and the like. The particular electrode combinations can be chosen for the particular fluid or gas, e.g., air or oxygen, to be employed as fuel. Where air or oxygen is employed, as in preferred practice, the active electrode material of the self-charging portions is zinc, as noted above.

FIG. 4 shows the honeycomb unit of FIG. 1 mounted in a battery case 32', the ends 30 of the cells 13 containing the first electrode material 14, e.g., Ag, and the second electrode material 15, e.g., Zn, being covered with an insulation material 32, as noted above. In the battery portions 17, electrical leads 33 are connected to each of the collector wires 29 of the zinc electrodes 15 contained in the cells 13 of the honeycomb 12 which are adjacent the cells 13 containing the silver electrodes 14, and leads 33 in turn are connected to the negative terminal or anode 34, and electrical leads 35 are connected to each of the collector wires 29 of the silver electrodes 14, and are in turn connected to a positive terminal or cathode 36. In the solid-fluid charging portions 18 of the unit, electrical leads 37 are connected to each of the collector wires 26 of the catalyst electrodes 16, which are in turn connected to a positive terminal or cathode 38; and electrical leads 39 are connected to the collector wires 29 of the zinc electrodes 15 in cells 13 adjacent the cells 13 containing the catalyst electrodes 16, which are in turn connected to a negative terminal or anode 40.

The terminals 34, 36, 38 and 40 are mounted on the cover 41 of the battery. The battery case 32' contains suitable openings or ports 42 to permit air to enter the case and to diffuse into the passages 27 of the honeycomb cells 13 containing the catalyst electrodes 16.

In FIG. 5, there is shown an enlarged cross-sectional detail of the embodiment of FIG. 1, showing a battery section 17 and a charging section 18 arranged schematically in an electrical circuit for discharging and charging, according to FIG. 4. As shown, a switch indicated at 45 connects the terminals 34 and 36 of the battery sections 17 to load 46 for discharge of the high energy density battery sections 17; upon discharge thereof, for recharging battery sections 17, the switch 45 can be actuated to connect the terminals 38 of the charging sections 18 to the terminals 34 of the battery sections 17, as indicated by dotted lines, with the terminals 40 of charging sections 18 being connected to terminals 36 of battery sections 17, by leads 47.

In the operation of the self-charging battery described above and illustrated in FIGS. 4 and 5, the high energy density storage cell sections 17 are discharged when connected to load 46 and in this process the Zn electrodes 15 are oxidized and the silver oxide electrodes 14 are reduced. By electrical connection of the battery sections 17 to the solid-fluid cell sections 18 as indicated at 47 and the dotted line position of switch 45 in FIG. 5, the air entering the ports 42 in the battery and diffusing through the passages 27 of the cells 13 containing the catalyst electrodes 16, impinges on the catalyst electrodes 16. At the catalyst electrodes, the oxygen is reduced and simultaneously the zinc of the zinc electrodes of sections 18 is oxidized to zinc oxide. The resulting current generated serves to recharge the battery sections 17 by reducing the zinc oxide of the Zn electrodes in sections 17 and oxidizing the Ag electrodes of sections 17 to silver oxide.

FIG. 6 illustrates connection of the high energy density battery sections 17 in an electric circuit connected in series; FIG. 7 shows the connection in parallel; and FIG. 8 shows the connection in series parallel.

The following are examples of practice of the invention:

EXAMPLE 1

A self-charging battery unit substantially as described above and illustrated in FIGS. 1, 4 and 5, is prepared employing an aluminum oxide honeycomb matrix having a porosity of about 20 percent To form the solid-fluid cell sections, catalyst electrodes are employed in the form of a rolled tantalum screen impregnated with platinum black, together with a collector screen in contact with the tantalum screen, and rolled metal zinc anodes. The high energy density storage cell or battery sections are formed employing metal zinc as described above as anodes and silver peroxide as cathodes. The thus filled honeycomb matrix 12 is then vacuum filled with 30 percent potassium hydroxide solution, but with no free electrolyte in the free gas diffusion spaces 27 provided in the cells 13 containing the tantalum screens 16, and the ends of the cells containing the zinc and silver electrodes are covered with an epoxy insulation covering as indicated at 32 in FIG. 4.

The resulting self-charging unit formed of the electrodes in an inorganic honeycomb matrix is positioned in a battery case as illustrated generally in FIG. 4, and the high energy density storage cell sections are discharged at 10 ma. rate for 15 hours. The high energy density storage cell sections have a voltage plateau of 1.42 volts during this period. The cell is recharged by connection with the solid-fluid cell recharging sections at a 10 ma. rate for 17 hours. Thereafter the battery sections are discharged and recharged in the above manner for 10 cycles.

EXAMPLE 2

A self-charging battery unit is provided comprising a porous inorganic honeycomb formed of a solid solution of magnesium silicate and iron silicate, with solid-fluid cell sections containing cells filled with zinc powder to form zinc anodes, and cells filled with tantalum screens impregnated with platinum black to form the catalyst cathodes. The high energy density battery or storage cell sections of the unit are formed with cells filled with nickel hydroxide powder and cells filled with cadmium oxide powder. The resulting matrix containing the electrode materials is then filled by vacuum filling with 30 to 40 percent potassium hydroxide solution, with no free electrolyte liquid in the spaces provided in the cells containing the tantalum screen catalyst electrodes.

The resulting unit is then positioned in a battery substantially as described above and illustrated in FIG. 4. The battery sections containing the high energy density storage cells are first electroformed to convert the cadmium oxide to cadmium and to form nickel oxide, as negative and positive electrodes, respectively. The battery is discharged and recharged substantially in the manner described in example 1.

EXAMPLE 3

A silver-zinc-platinum catalyst self-charging battery as described in example 1 is assembled, except that the honeycomb separator is formed of microporous regenerated cellulose. Although the unit operates satisfactorily at ambient temperature, it has a shorter life than the battery of example 1, employing an inorganic honeycomb matrix, and has limited utility at elevated temperature.

EXAMPLE 4

A silver-zinc-platinum catalyst self-charging battery is assembled in the manner described in example 1 except that the arrangement of the cells is according to the embodiment shown in FIG. 2, whereby each cell filled with zinc powder is surrounded by two adjacent cells containing silver oxide and three adjacent cells containing platinum catalyst electrodes. In such an arrangement, the zinc acts as the anode for the solid-fluid cell sections and for the storage cell sections.

The resulting unit is assembled into a battery as illustrated generally in FIG. 4 and discharged and charged over a number of cycles, and exhibits efficient electrical characteristics.

In the description above and in FIGS. 1, 2 and 5, several embodiments are described and shown for the arrangement of the cells in the honeycomb matrix in order to form the solid-fluid cell sections and the storage cell sections of the self-charging battery. In preferred practice, as previously noted, and as illustrated in FIGS. 1 and 4, empty cells 13 of the honeycomb are disposed between the solid-fluid cell sections, e.g., 18, and storage cell sections, e.g., 17. Such an arrangement is particularly advantageous where it is desired to promote heat transfer in the unit, e.g., for heat dissipation, for such an arrangement permits the electrolyte to be introduced into and to circulate freely through the empty cells 13, to thus dissipate heat and also remove any undesirable products formed in the cell. For this purpose, the unit is impregnated with electrolyte, but without introducing free electrolyte into the gas passages 27 of the catalyst electrodes 16. Also if desired, the cell walls 20 can be broken away to increase the size of some cells as compared to the normal size of the cells 13.

It will be understood also that the cells of the honeycomb matrix can have any desired shape. Thus, although usually such honeycombs are provided with hexagonal cells, such cells can be, for example, circular, or of any other polygonal shape. Further, it will be understood that the honeycomb can be cut to any desired size, shape or configuration and can be employed to form large or small high energy density self-charging batteries, with honeycombs of any desired depth.

While one or both ends of the first and second electrode materials can be covered with an insulation, as at 32 in FIG. 4, the ends of such electrodes need not be covered with any insulation material. However, in the latter instance, reduced insulation of the electrode compartments results.

Further, it will be understood that any suitable electrolyte or electrolyte solution can be used in the honeycomb unit of the invention, including acidic or basic electrolytes.

From the foregoing it is seen that the invention provides a unitary self-contained battery and battery charger, incorporated in a single honeycomb matrix forming the separators for the electrodes contained in the cells of the honeycomb in both the battery and charging sections.

Various modifications are contemplated and can be resorted to by those skilled in the art without departing from the spirit of the invention, and hence the invention is not to be taken as limited except by the scope of the appended claims.

I claim:

1. A self-charging battery which comprises a nonmetallic honeycomb matrix containing at least one rechargeable high energy density battery section for generating power and at least one charging section for charging said battery section, said battery section comprising a first set of first and second active electrodes of opposite polarity positioned in cells of said honeycomb matrix, said first and second electrodes being composed of active electrode materials selected from the group consisting of zinc, silver, cadmium and nickel, the composition of said second electrodes being different from the composition of said first electrodes, said charging section being a solid-fluid section comprising a second set of third and fourth electrodes of opposite polarity positioned in other cells of said honeycomb matrix, the composition of said fourth electrodes being different from the composition of said third electrodes, said third electrodes being catalyst gas diffusion electrodes and said fourth electrodes being active battery electrodes, said catalyst gas diffusion electrodes each comprising a catalyst and having a gas diffusion space adjacent said catalyst, said gas diffusion space being defined between the catalyst and walls of said honeycomb matrix, said honeycomb matrix being a common separator for said first and second electrodes of said at least one rechargeable battery section and for said third and fourth electrodes of said at least one charging section, said honeycomb forming an integral continuous bonded separator, and having a porosity or conductivity permitting transfer of electrolyte ions but preventing transfer of electrode ions, and means for electrically connecting said third and fourth electrodes of said at least one charging section to said first and second electrodes of said at least one battery section for charging same.

2. A self-charging battery as defined in claim 1, wherein said first and second electrodes of said battery section are positioned in adjacent cells of said honeycomb matrix and said third and fourth electrodes of said charging section are positioned in adjacent cells of said honeycomb matrix.

3. A self-charging battery as defined in claim 1, said battery including a plurality of said rechargeable battery sections and a plurality of said charging sections.

4. A self-charging battery as defined in claim 1, wherein said first electrodes are formed of a first active electrode material, said second and fourth electrodes are formed of the same second electrode material, said third catalyst electrodes being formed of a third catalyst electrode material.

5. A self-charging battery as defined in claim 4, wherein said first electrode material is positioned in a first series of cells of said honeycomb matrix, said second electrode material is positioned in a second series of cells of said honeycomb matrix, and said third electrode material is positioned in a third series of cells of said honeycomb matrix.

6. A self-charging battery as defined in claim 5, the second series of cells containing said second electrode material being adjacent said first series of cells containing said first electrode material and adjacent said third series of cells containing said third catalyst electrode material.

7. A self-charging battery as defined in claim 6, wherein said second series of cells containing said second electrode material are in alternate juxtaposition with respect to the cells containing said first electrode material, and said second series of cells containing said second electrode material are in alternate juxtaposition with respect to the cells containing said third electrode material, whereby adjacent electrodes of opposite polarity are separated from each other by a single cell wall.

8. A self-charging battery as defined in claim 5, wherein said second series of cells containing said second electrode material is divided so that some of said second series of cells are adjacent said first series of cells containing said first electrode material, and the remainder of said second series of cells containing said second electrode material are adjacent said third series of cells containing said third catalyst electrode material.

9. A self-charging battery as defined in claim 1, the cells containing said third catalyst electrodes also containing a free fluid diffusion space in said cells to permit diffusion of a fluid into said last-mentioned cells for contact of said fluid with said catalyst electrodes.

10. A self-charging battery as defined in claim 1, said honeycomb matrix being porous for retention of an aqueous electrolyte, and having a porosity permitting transfer of electrolyte ions but preventing transfer of electrode ions.

11. A self-charging battery as defined in claim 1, said honeycomb matrix being formed of a porous substantially rigid inorganic material.

12. A self-charging battery as defined in claim 1, said honeycomb matrix being formed of a porous ceramic material.

13. A self-charging battery as defined in claim 1, said honeycomb matrix being an alumina honeycomb matrix.

14. A self-charging battery as defined in claim 1, said honeycomb matrix being composed of a solid solution of magnesium silicate and iron silicate.

15. A self-charging battery as defined in claim 4, said first electrode material being a silver electrode said second electrode material being a zinc electrode, and said third catalyst electrode material being a platinum catalyst electrode.

16. A self-charging battery as defined in claim 2, said honeycomb matrix being a porous ceramic honeycomb matrix having a substantially continuous wall and having substantial depth in comparison to wall thickness, electrical connections to each of said electrodes, and terminals for said connections, said means for electrically connecting said electrodes of said charging section to said electrodes of said battery section including switch means.

17. A self-charging battery as defined in claim 16, wherein said first electrodes are formed of a first active electrode material, said second and fourth electrodes are formed of the same second electrode material, said third catalyst electrodes being formed of a third catalyst electrode material.

18. A self-charging battery as defined in claim 16, wherein each of said second electrodes of said battery section being disposed adjacent a plurality of said first electrodes of said battery section, each of said fourth electrodes of said charging section being disposed adjacent a plurality of said catalyst electrodes, said at least one battery section being spaced from said at least one charging section in said honeycomb matrix by a plurality of empty honeycomb cells.

19. A self-charging battery as defined in claim 18, said first electrodes being silver electrodes, said second and fourth electrodes being zinc electrodes, and said third catalyst electrodes being platinum catalyst electrodes.

20. A self-charging battery as defined in claim 17, wherein each of said second electrodes being common to said battery section and to said charging section, each of said second electrodes being disposed adjacent a plurality of said first electrodes of said at least one battery section and adjacent a plurality of third electrodes of said at least one charging section.

21. A self-charging battery as defined in claim 20, said first electrodes being silver electrodes, said common second electrodes being zinc electrodes and said third catalyst electrodes being platinum catalyst electrodes.